United States Patent

Lind

[11] Patent Number: 5,146,418
[45] Date of Patent: Sep. 8, 1992

[54] TRIGONOMETERIC FUNCTION GENERATION FOR USE IN DIGITAL SIGNAL PROCESSING

[75] Inventor: Larry F. Lind, Colchester, England

[73] Assignee: British Telecommunications public limited company, London, England

[21] Appl. No.: 564,467

[22] Filed: Aug. 9, 1990

[30] Foreign Application Priority Data

Aug. 11, 1989 [GB] United Kingdom ............... 8918337

[51] Int. Cl.$^5$ ............................................. G06F 7/38
[52] U.S. Cl. ................................. 364/729; 364/726
[58] Field of Search ............. 364/729, 723, 721, 718, 364/726

[56] References Cited

U.S. PATENT DOCUMENTS

| | | |
|---|---|---|
| 4,536,853 | 8/1985 | Kawamoto et al. ............ 364/723 X |
| 4,718,030 | 1/1988 | Tsutsumi ............................ 364/721 |
| 4,870,606 | 9/1989 | Sasahara ...................... 364/729 X |

FOREIGN PATENT DOCUMENTS 0259514 9/1986 European Pat. Off.
58-80766 5/1983 Japan .

Primary Examiner—Tan V. Mai
Attorney, Agent, or Firm—Nixon & Vanderhye

[57] ABSTRACT

A sequence of N sine and/or cosine values, e.g. for Fourier Transforms, quadrature demodulation or test tone generation, is produced by interpolation from a geometrically-spaced table of initial sine values using a first interpolation formula. After being output, each sine value is replaced in the table by a further calculated value, so the sine table size is kept at $M=(\text{Log}_2 N)+2$ (where N is the number of sine values in the sequence). To avoid round-off errors at widely-spaced interpolations, a second interpolation formula is selectively used in which sine values are interpolated from cosine values. A cosine table is therefore maintained concurrently with the sine table.

9 Claims, 3 Drawing Sheets

TRIGONOMETERIC FUNCTION GENERATION FOR USE IN DIGITAL SIGNAL PROCESSING

FIELD OF THE INVENTION

This invention relates to a method and apparatus for generating trigonometric function values particularly for use in digital signal processing, particularly (but not exclusively) for generating sine and cosine function values.

BACKGROUND AND SUMMARY OF THE INVENTION

In many areas of digital signal processing, there is a need to generate a sequence of sampled sine and cosine functions. Examples that come immediately to mind are Fourier transform evaluations, digital quadrature demodulators, and generation of test tones.

A direct method is to use a stored table look-up procedure wherein a table of function values corresponding to argument values is provided. This method offers high speed, and as much accuracy as desired. Its main problem is excessive memory storage. If a 1024 point sequence is required for example, with 16 bit arithmetic, a 32 Kbyte ROM is needed just to store the sine and cosine waveforms (assuming no repeats of the data).

In a second method, if we are willing to invest some computation time per cycle, this memory requirement can be reduced dramatically by providing an arithmetic unit for calculating function values. For example, the simple recursion $$\sin[(n+1)x] = \cos(x)\sin(nx) + \sin(x)\cos(nx)$$

$$\cos[(n+1)x] = \cos(x)\cos(nx) - \sin(x)\sin(nx)$$

requires four multiplications per cycle and needs only a few memory locations.

One has an uneasy feeling about using these formulas however, as an extrapolation is involved. Round-off errors will occur, and grow as the extrapolation proceeds. The related phasor tends to spiral inwards or outwards, rather than retain constant amplitude.

One known way of overcoming this extraplation problem is to slightly lengthen the phasor increment. The running phasor is thus given a small outward movement on each update. Then, assuming the arithmetic used in the dsp calculating device saturates for sample values greater than 1, the output will be (slightly) clipped, but stable. The problem with this method is that it can build up a considerable error before clipping occurs, so the resulting error is large. An alternative, third method is based on interpolation (1), (2). The sine and cosine functions, initially accurately calculated over a small set of sample points, which span the range of interest, are stored. These values are used as inputs to an algorithm performed by an arithmetic unit, which uses interpolation calculations to find all remaining values. Small errors can and will occur, but they are significantly smaller than errors from an extrapolation algorithm.

The price paid for this increased accuracy is a small increase in computation time over the first method, and a modest increase in memory size over the second.

In one simple method of interpolation, described in (3), a short table of length $(\log_2 N)+2$ where N is the number of derived angular values (spaced at $2\pi/N$) including sec values of $(\pi/4), (\pi/8), (\pi/16) \ldots (\pi/N)$, is used to calculate successive levels of a table of interpolated function values, starting from values at $\pi/4$, 0 and interpolating to find values at $\pi/8$ and $3\pi/8$, then interpolating between these to find those at $\pi/16$, $3\pi/16$, $5\pi/16$ and $7\pi/16$ etc. This method has disadvantages, however, because since the function values are not created in the desired succession a large table (of length N) must be created before the values can be output. This also involves a calculation delay before the output of the first desired values.

In a second method described in (1), the same interpolation equation is employed, but instead of creating a large table of length N holding all the desired function values, the algorithm employs a short table of length $(\log_2 N)+2$, which at any given time contains the current function value of the sequence, the two values between which the next function value of the sequence will be interpolated, and the values necessary to progressively interpolate all further function values in the sequence; whenever an entry value in that table has been used, it is replaced by a new interpolation value to be used in a later step. The nature, and the total number of calculations is the same as in the previous method, but the storage required for the table is considerably reduced and the results appear, in sequence, without initial delay.

Of course, the two methods are not necessarily mutually exclusive.

A way of implementing this latter interpolation method is as follows.

We begin by looking at the working vector or array V, of size $(\log_2 N)+2$, from which a sequence of sine values are obtained. This vector has some of the sine values which will be output as sample values. As a sample value is output, it is replaced by another sample value which will be used later on. Below is a five element vector, which shows the flow of data storage and computation in calculating up to 128 values of a sine. For simplicity, an element is shown by an integer number, which in reality represents a sine value. For example, the 16 in row 1 (at position $V_4$) stands for $\sin(16*\phi_o)$, where $\phi_o$ is the angular spacing between sine samples.

TABLE 1

| | j = | | | | |
|---|---|---|---|---|---|
| n | 4 | 3 | 2 | 1 | 0 |
| 1 | 16 | 8 | 4 | 2 | *1* |
| 2 | 16 | 8 | 4 | *2* | 3 |
| 3 | 16 | 8 | 4 | 6 | *3* |
| 4 | <u>16</u> | 8 | *4* | 6 | 5 |
| 5 | 16 | 8 | 12 | 6 | *5* |
| 6 | 16 | 8 | 12 | 6 | 7 |

Looking at the situation at the stage where the first output value is to be output (time n=1), the italicised element in that row, $\sin(1*\phi_0)$, is output ($V_0$ is output), and replaced by $\sin(3*\phi_0)$. This value is computed using the underlined elements in the row, and with the interpolation formula $$\sin(K*\phi_0) = [\sin((K+L)\phi_0) + \sin((K-L)\phi_0)]/[2*\cos(L\phi_0)] \quad (1a)$$

for K=3, L=1 in this case. In general the Ls are powers of two, and so the factors $1/[2*\cos(L\phi_0)]$ are precomputed, stored, and then looked up when necessary. The other rows, representing successive sample output times, are similarly output and computed.

A sequence of cosine values can be generated in a similar manner, since there is a cosine interpolation $$\cos(K^*\phi_0) = [\cos((K+L)\phi_0) + \cos((K-L)\phi_0)]/[2^* \cos(L\phi_0)] \quad (1b)$$

Another vector of the same size as V is needed for storing the cosine values, but the same j, $j_a$, and $j_b$ apply. Thus the cosine sequence is cheap and easy to produce simultaneously with the sine sequence.

There can be an accuracy problem with both these methods, especially when the factor $1/[2^* \cos(L\phi_0)]$ has a large magnitude (as will occur when $L\phi_0$ is around $\pi/2$, $3\pi/2$ etc). This implies that the numerator part of the interpolation, $\sin([K+L]\phi_0) + \sin([K-L]\phi_0)$, has a small value, implying subtraction of two nearly equal quantities. The subtraction gives round-off error in finite precision hardware (more so in fixed-point than in floating point hardware). Furthermore, the inaccurate interpolation is usually itself used to produce further interpolations, so that the error propagates through further calculations.

Accordingly, in the invention, the problem can be overcome by using a different trigonometric interpolation around such argument values. According to the invention, there is provided a trigonometric function generator for generating a value of a trigonometric function in response to an input argument comprising: input means for receiving an input argument; first store means for storing values of the function corresponding to spaced argument values; and arithmetic means for interpolatively calculating, using a first algorithm, values of the function corresponding to arguments lying in the spaces between those spaced argument values; characterised in that it further comprises:

second store means for storing values of a second, complementary function corresponding to spaced argument values;

arithmetic means for interpolatively calculating, using a second algorithm, values of the first function corresponding to arguments lying in the spaces between those spaced argument values from values of the second function corresponding to the neighbouring predetermined argument values; and control means for selectively employing the second store and algorithm for an input argument which would, using the first store and algorithm, give rise to a substantial round-off error in said function value.

For example, in the case of the above method, instead of computing ...

$$\sin(K^*\phi_0) = [(\sin([K-L]\phi_0) + \sin([K-L]\phi_0)]/[2^* \cos(L\phi_0)] \quad (1a)$$

$$(or = [(\sin([K-L]\phi_0) + \sin([K-L]\phi_0)]^* \sec(L\phi_0)/2)$$

where $\cos(L\phi_0)$ is very small, we use $$\sin(K^*\phi_0) = [(\cos([K+L]\phi_0) - \cos([K-L]\phi_0)]/[2^* \cos(\pi/2+L\phi_0)] \quad (2a)$$

$$\cos(K^*\phi_0) = [(\sin([K-L]\phi_0) - \sin([K+L]\phi_0)]/[2^* \cos(\pi/2+L\phi_0)] \quad (2b)$$

and $\cos(\pi/2+L\phi_0) = \sin(L\phi_0)$.

Hence the sine value is found by using entries from the cosine vector (and vice versa). This cooperation between the two vectors ensures that accuracy is preserved at all times. The decision between using one or other of the above formulas depends on the $L\phi_0$ value. If $L\phi_0$ is closer to $n\pi$ than $m\pi/2$, where M is odd, use equation (1a). Otherwise, use equation 2a. A numeric example will suffice to illustrate the benefit of the invention. Let $K\phi_0 = 20°$ $L\phi_0 = 89.9°$ and 4 place accuracy used throughout. Equation (1a) gives $$\sin(20°) \approx 286.5(0.9403 - 0.9391) = 0.3438$$

whereas equation (2a) yields the correct result $$\sin(20°) = -0.5000(-0.3404 - 0.3437) = 0.3420$$

At least one decimal place of accuracy has been lost with equation (1a).

The price paid for this is the extra memory space required for storing the complementary function interpolation values and the (small number of) extra calculations per cycle needed to update these stored values. Of course, if it is in any case desired to generate the complementary function (as, for example, in Fourier analysis) then the benefit of the invention is obtained without any extra memory being required.

BRIEF DESCRIPTION OF THE DRAWINGS

The invention will now be illustrated, by way of example only, with reference to the accompanying drawings in which.

DETAILED DESCRIPTION OF PRESENTLY PREFERRED EXEMPLARY EMBODIMENTS

Figure 1:
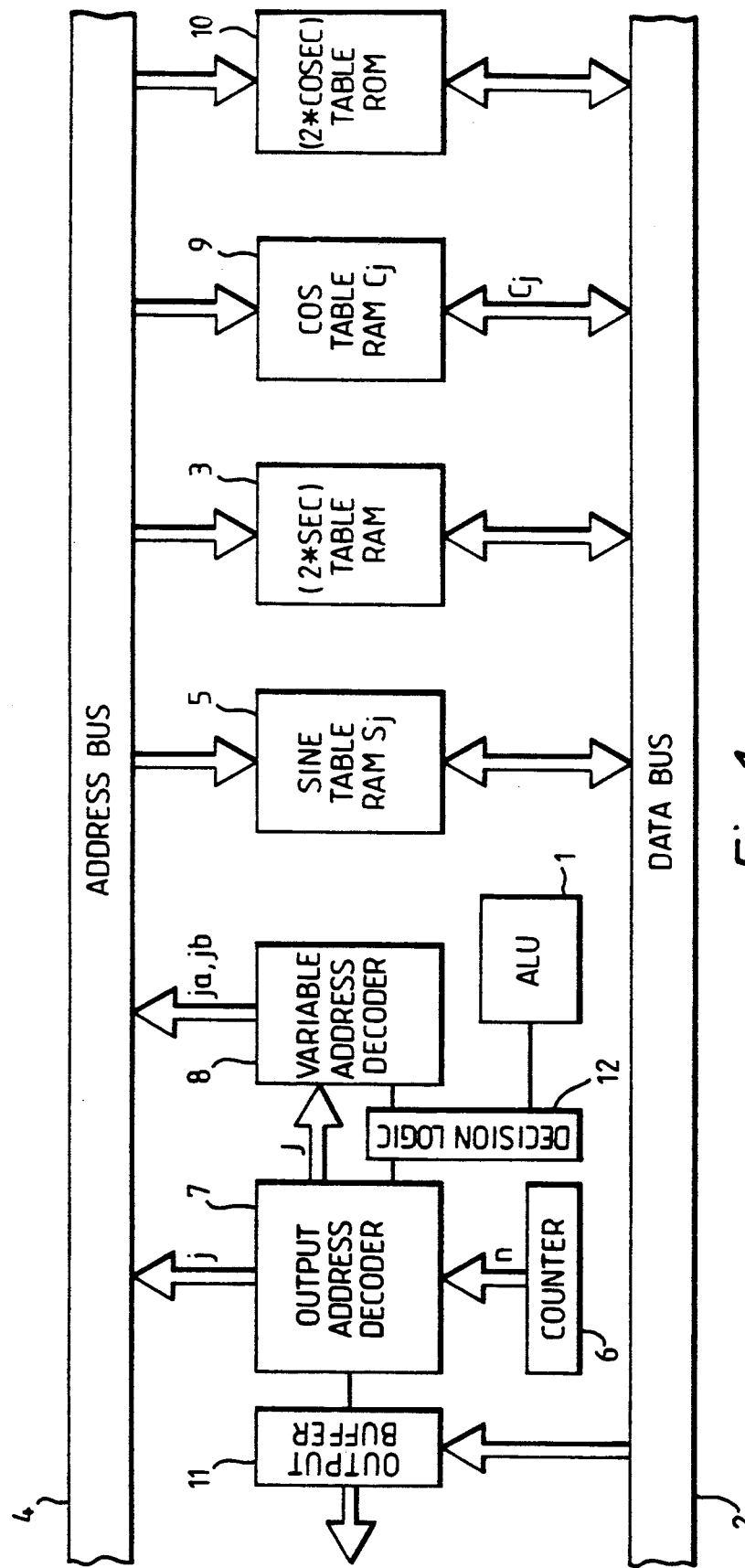
FIG. 1 is a block diagram of apparatus suitable for putting the invention into effect.

Referring once more to Table 1, when using the second interpolation method, two central questions are how the algorithm knows which element $V_j$ to output and which two elements $V_{ja}$ and $V_{jb}$ are to be used to find the replacement element. We consider first how to find j. Then simple formulas are found for $j_a$ and $j_b$.

The element that is output is located in position j in V, where j is the rightmost 1 of n (expressed in binary form). For example, for n=6 (110), its rightmost 1 is 1, and so j=1, and $V_1$ is output. For n=5(101) (and all other odd n values), $V_0$ is output. Our first problem then is, given m, how to locate its rightmost 1. The operation of finding the number of trailing zeroes of a binary integer is offered by some computers as part of their instruction repertoire or can be found, using a machine code routine, by successive rightward shifts and bit-tests. Another method is performed as follows. We start by forming J=(n AND −n) (assuming n is in twos complement form). J will contain a single 1, at the rightmost 1 position. For example, if n=4=(0100), −n=(1100), and J=n AND −n=(0100).

From J, we want to extract j, using as few steps as possible. If we imagine j to have the binary representation $j=j_2j_1j_0$, we find each of the $j_i$ by an AND operation, then compute j by using nested multiplication. To make this clear, we form a table of the eight possible 8 bit J values.

| | | | | j = | | | | | | |
|---|---|---|---|---|---|---|---|---|---|---|
| 7 | 6 | 5 | 4 | 3 | 2 | 1 | 0 | $j_2$ | $j_1$ | $j_0$ |
| | | | | | | | 1 | 0 | 0 | 0 |
| | | | | | | 1 | | 0 | 0 | 1 |
| | | | | | 1 | | | 0 | 1 | 0 |
| | | | | 1 | | | | 0 | 1 | 1 |
| | | | 1 | | | | | 1 | 0 | 0 |
| | | 1 | | | | | | 1 | 0 | 1 |
| | 1 | | | | | | | 1 | 1 | 0 |
| 1 | | | | | | | | 1 | 1 | 1 |

The zeroes for each J value in the left side of the table have not been shown, for clarity. For example, J on the first row is 00000001. It is seen that
$j_2 = 1$, if bits 7, 6, 5, or 4 in $J = 1$.
So $A(2,3) = (11110000) = 240$.
$j_1 = 1$, if bits 7, 6, 3, or 2 in $J = 1$.
So $A(1,3) = (11001100) = 204$.
$j_0 = 1$, if bits 7, 5, 3, or 1 in $J = 1$.
So $A(0,3) = (10101010) = 170$.

The A(r,s) represent the numbers that J is ANDed with, to test for a 1 in various bit positions of J. That is, $j_2 = J$ AND $A(2,3)$, $j_1 = J$ AND $A(1,3)$, $j_0 = J$ ANS $A(0,3)$ The s in A(r,s) indicates that J has $2^s$ binary bits in its representation. Finally, j is formed from the nested multiplication $$j = ((j_2)*2+j_0$$

There is a simple result for calculation the A(r,s) values, given any r,s. To see this, we combine the above A values as follows:

```
    A(2,3) = (11110000)        A(1,3) = (11001100)

2⁻²² A(2,3) = (00001111)   2⁻²¹ A(1,3) = (00110011)
     sum   = (11111111)         sum   = (11111111)

A(0,3) = (10101010)

2⁻²⁰ A(0,3) = (01010101)
     sum   = (11111111)
```

The sum is the same in all three cases. This generalises to $$A(r,s) + 2^{-(2r)}A(r,s) = 2^{2s} - 1, \text{ or}$$

$$A(r,s) = 2^{2r}(2^{2s} - 1)/(2^{2r} + 1)$$

As a check, let $r = 2$, $s = 3$. Then $A(2,3) = 16*255/17 = 240$, the correct answer.

Now that we have found j, $V_j$ (the current function value) can be output. We must next find $j_a$ and $j_b$, the locations of the two sine values to be averaged together to form the next interpolated value stored in the vector at position $V_j$; we start with a decomposition of arguments.

Recall in the vector table that the argument for the quantity to be output is n, the counter input, which is in the jth position. Also recall from the above work that $J = (n$ AND $-n) = 2^j$ is also available. Inspection of the vector table shows that the next argument in column j will be $n + 2^{j+1}$. We want this value to be the average of $n_1$ and $n_2$, the arguments of the sine terms to be averaged. To achieve this, we let $$n_1 + n_2 = 2(n + 2^{j+1}) = 2n + 2^{j+2} = 2n + 2^{j+1} + 2^j 2^j$$

for $n_1$ and $n_2$ to be distinct, we let $$n_1 = n + 2^j, \quad n_2 = n + 2^{j+1} + 2^j$$

With this decomposition of arguments, we next look at four possible formations of $n_1$ and $n_2$.

| | | j + 1 | j | lower |
|---|---|---|---|---|
| | | Case 1 | | |
| n = | * | 0 | 1 | 0...0 |
| $2^j =$ | | | 1 | 0...0 |
| $n_1 =$ | * | 1 | 0 | 0...0 |
| | | Case 2 | | |
| n = | * | 1 | 1 | 0...0 |
| $2^j =$ | | | 1 | 0...0 |
| $n_1 =$ | * | 0 | 0 | 0...0 |
| | | Case 3 | | |
| n = | * | 0 | 1 | 0...0 |
| $2^{j+1} + 2^j =$ | | 1 | 1 | 0...0 |
| $n_2 =$ | * | 0 | 0 | 0...0 |
| | | Case 4 | | |
| n = | * | 1 | 1 | 0.00 |
| $2^{j+1} + 2^j =$ | | 1 | 1 | 0...0 |
| $n_2 =$ | * | 1 | 0 | 0...0 |

Cases 1 and 4 show that $n_1$ or $n_2$ will appear in the $j_1 = j + 1$ column. Then case 1 and 3, or case 2 and 4 show that the other argument will occur in a higher value column. To find the argument $n_a$ in the adjacent $j + 1$ column, cases 1 and 4 lead to the formation $$n_a = n + 2^{j+}(2^{j+1} \text{ AND } n)$$

The other n will be $$n_b = 2n + 2^{j+1} + 2^j + 2^j - (n + 2^j + (2^{j+1} \text{ AND } n))$$
$$= n + 2^{j+1} + 2^j - (2^{j+1} \text{ AND } n)$$

Bearing in mind that $J = 2^j$ has already been found, $$n_b = n + 3J - (2J \text{ AND } n)$$

The rightmost 1 of $n_b$ ($j_b$) and that of $n_a$ ($j_a$) are located from $n_b$ and $n_a$ using the methods that yielded j from n. Finally, the replacement element is calculated by interpolation from the $V_{ja}$ and $V_{jb}$ elements of V, using equation 1a (or 2a).

Referring to FIG. 1, one kind of apparatus which may be used to put the invention into effect will now be described. In this embodiment the function generator comprises an arithmetic logic unit 1 capable of performing finite precision (e.g. 12, 16 or 32 bit) addition, subtraction and multiplication (or division) operations under the command of a program input. The input to the arithmetic unit ALU 1 is via a data bus 2 (typically 12 or 16 bits wide). Connected to the data bus 2 is a memory 3 comprising $M = (\log_2 N) - 2$ sequential memory locations each holding a binary representation of a constant value. The values are the array of secants used in the interpolation formula $(1/[2*\cos(L)]$, where $L = 2^0, 2^1, 2^2, \ldots)$ and, since the store is not written to, it may be a ROM. Of course, cosine constants could be stored and used instead, if the ALU 1 can perform division. The store is accessed via an address bus 4. A RAM 5 comprising a plurality M of sequential memory locations is also addressed from address bus 4, and coupled to data bus 2. This RAM holds the working vector $S_j$ (equivalent to $V_j$ discussed above) which stores interpolated function values (in the following, the function will be exemplified by a sine function), including the current value. An incremental counter 6, initially set to one, produces successive input values up to N which are supplied to an output address decoder logic circuit 7. This circuit generates the address in sine table RAM 5 of the function value to be output by the generator, by locating the rightmost '1' in the binary representation of the input value from counter 6, using, for example, one of the algorithms described above. This value is supplied to the address bus 4. A second address decoder circuit 8 generates, for the input value provided by the counter 6, the two addresses in the sine table RAM 5 of sine values $S_{ja}$ & $S_{jb}$ between which the replacement element of vector S will be calculated to replace $S_j$.

Also provided is a RAM 9, of the same size M as RAM 5, for holding the working cosine vector $C_j$, and a ROM 10 of the same size as ROM 3, for holding the corresponding array of cosecants.

Of course, all four stores 3, 5, 9 and 10 could be partitioned areas of the same RAM device. Also since, as will be seen, for any given value of L either the sec or the cosec constant, but not both, will be used in interpolation, only a total of $M(=(\log_2 N)+2)$ of both need be stored; the values of sec for low L and cosec for high L. However, for simplicity, in the following, the stores 3, 5, 9 and 10 will be treated as separate.

Where the function generator is to stand alone (as, for example, a tone generator), an output buffer 11 connected to the data bus 2 will be provided (which may further include a DAC to provide analogue output).

The flow of operation of this device will now be explained.

Counter 6 provides a value of n (the input value to the generator). Output address decoder 7 receives n and locates from it the position in sine table RAM 5 of the next value to be output, by locating the column of the rightmost 1 as explained above. The value j is passed to variable address decoder, which calculates the addresses $j_a$ and $j_b$ of the two values from which the next (replacement) sine value will be interpolated, using the method described above. Next, decision logic 12 thresholds j to determine which algorithm to use to calculate the next value. Decision logic 12 causes the addition to $j_a$ and $j_b$ of the base address either of the sine table RAM 5 or the cosine table RAM 9. The two addresses are then loaded in turn onto address bus 4 and the corresponding values $S_{ja}$ and $S_{jb}$ or $C_{ja}$ and $C_{jb}$ from the relevant RAM 5 or 9 are put on the data bus, and read into registers of the ALU 1.

Then, in output address decoder 7, j is added to the offset base address of the sine table RAM 5 and loaded onto the address bus 4. Sine table RAM 5 consequently puts the relevant sine output value $S_j$ on the data bus 2, and output buffer 11 is enabled to provide a buffered output.

If j is low (corresponding to low $L\phi_o$, or at any rate the one nearer $n\pi$ than $m\pi/2$), output address decoder 7 adds an offset corresponding to the base address of the sec table ROM 3 to j, and loads the result onto the address bus 4. Sec table ROM 3 accordingly puts the next value of $\frac{1}{2}*\cos(L\phi_o)$ onto the data bus 2. ALU 1 is enabled to read this value into a register.

If j is high (corresponding to a high $L\phi_o$), an offset corresponding to the cosec table ROM 10 base address is added instead.

ALU 1 now holds (in 3 registers) the data necessary to calculate the new sine interpolation to replace the output value.

Decision logic 12 supplies either an add or a subtract instruction to ALU 1, which thus either adds $(S_{ja}+S_{jb})$ or subtracts $(C_{jb}-C_{ja})$ the contents of the first 2 registers, and multiplies the result by the relevant constant held in the third register.

The new sine value generated is loaded by ALU 1 onto data bus 2, and the address j (added to the sine table RAM offset base address) is loaded by output address decoder onto address bus 4, whereby the replacement value overwrites the just-output value in the sine table RAM 5.

Next, the replacement element of the cosine table RAM 9 is calculated and stored, in the same manner as above, using the addressed j, $j_a$ and $j_b$. If so desired, the existing cosine element may also be output.

Counter 6 is then incremented and the next cycle commences.

It is usually convenient to implement the two RAMs 5, 9 as a single device, and likewise the two ROMs 10, 3.

Figure 2:
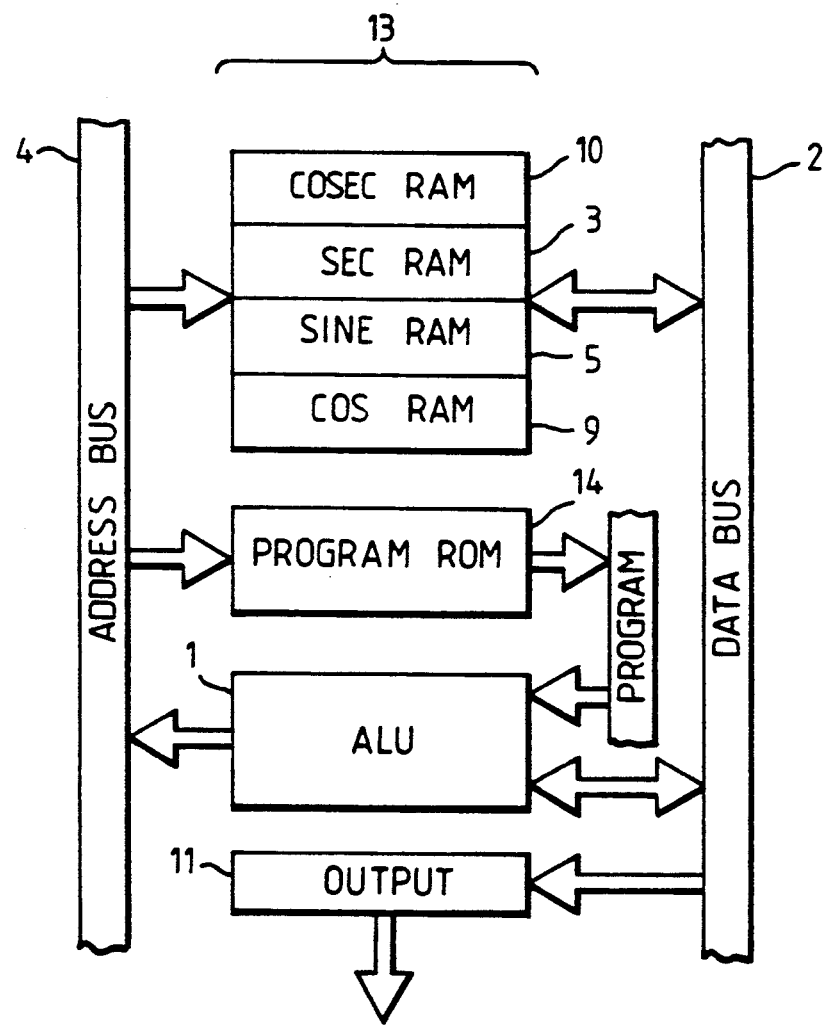
FIG. 2 is a block diagram showing a realisation of the apparatus of FIG. 1.
Figure 3:
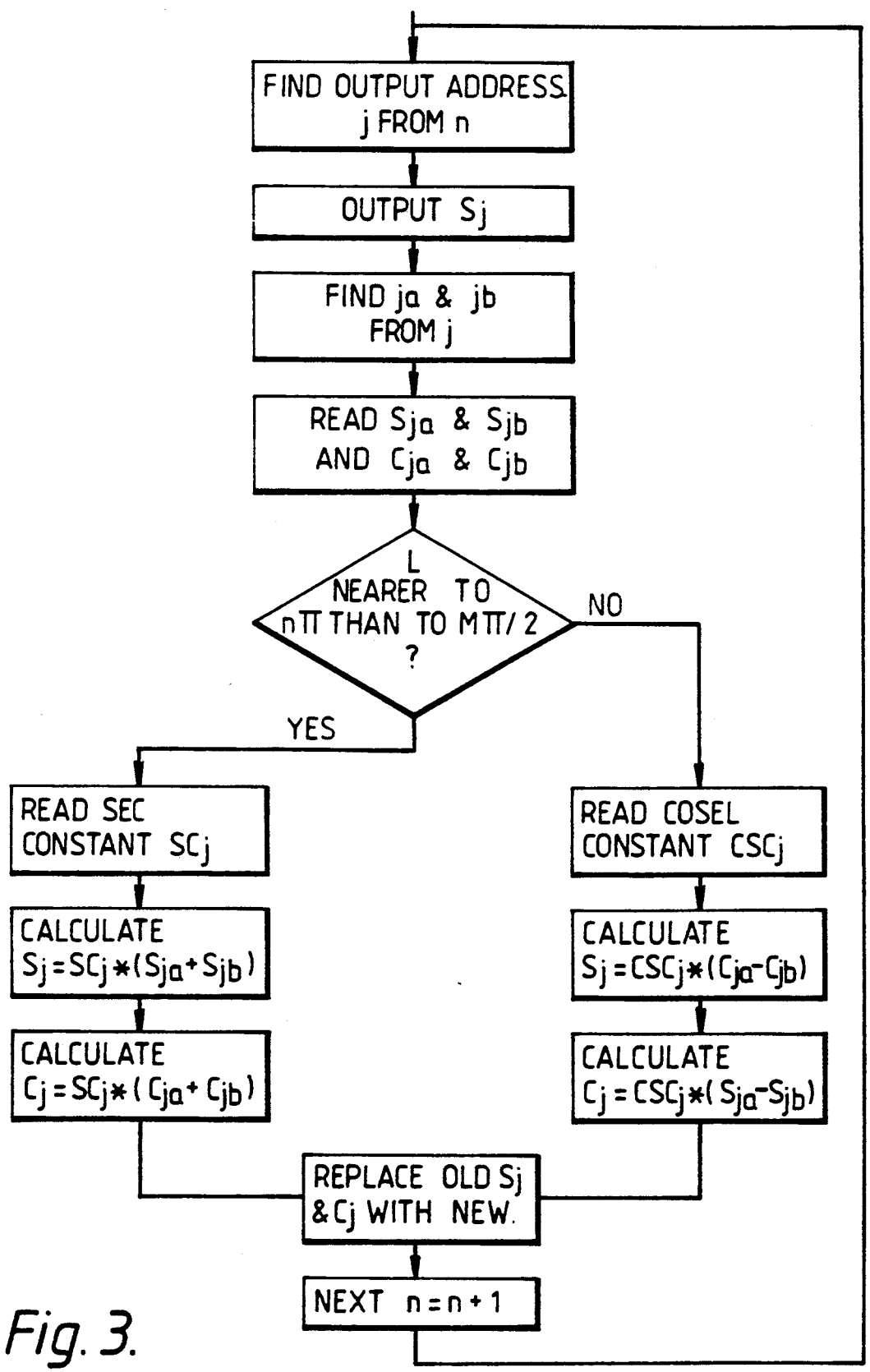
FIG. 3 is a flow diagram of one exemplary method of performing the invention.

Referring to FIG. 2, stores 3, 5, 9 and 10 may be realised as areas of a single RAM device 13. Counter 6 is conveniently realised as a register of ALU 1. Decision logic 12, variable address decoder 8 and output address decoder 7 are all conveniently realised by ALU 1 acting under a control program stored, for example, in a program ROM 14, following the logic of FIG. 3, ALU is conveniently a DSP device, e.g. a member of the AT&T DSP family (and may include onboard RAM or ROM 13 and/or 14), and the program implementing the invention may form part of another program (for example, one implementing a Fourier transform on an input signal).

Although the invention has been described with reference to the second interpolation method disclosed, it is equally applicable (in a broad sense) to the first.

Other trigonometric functions than sin and cos may be generated in the same manner.

The invention is especially useful in interpolating periodic, alternating functions since these are particularly likely to produce small differences between large numbers; one class of such functions are those readily derivable from sine and cosine functions (such as tangent functions).

In more general terms, another class of functions to which the invention is applicable are the exponential functions:

$$e^{(c*(n+k))} = e^{(c*n)}*e^{(c*k)}$$

$$e^{(c*(n-k))} = e^{(c*n)}*e^{-(c*k)}$$

$$e^{(c*(n+k))} + e^{(c*(n-k))} = e^{(c*n)}*(e^{(c*k)} + e^{(-ck)})$$

where c is a constant which may be complex. Sine and cosine functions are special cases of this class of function, which include damped harmonic functions. The relevant interpolation equations are derivable, from inspection, by one skilled in the art.

Decision logic 12 need not necessarily decide which algorithm to employ on the basis of the value of j or L but could, for example, perform the subtraction stage and determine whether the result is the difference of two nearly equal quantities (which will produce round-off errors). Counter 6 could, of course, count down instead of up (with a slight change to the procedure for deriving $j_a$ and $j_b$), and, in principle, more complex waveforms could be generated by counting up and then down.

As stated above, an important application of the invention is in digital signal processing which receive an input signal, perform an operation and generate a processed output signal; one class of such devices perform spectral transformations on sequential portions of the input signal. The invention is especially useful in calculating short term Fourier, Discrete Cosine or Sine Transforms, which are widely used in real-time signal processing operations (where speed and memory savings are vital) such as high-compression video coding. However the invention has other applications; for example, in generating high-purity signal waveforms for testing or quadrature demodulation in which a sequence of function values are generated and output, via a DAC, to provide an analogue waveform. The invention could also be employed in hand held calculators.

REFERENCES

1. Buneman O—'Stable On-line Creation of Sines or Cosines of Successive Angles', Proc. IEEE, vol 75, no 10, pp 1434–1435, October 1987.
2. Lind L F—'Stable On-line Creation of Some Common Functions', IERE Fifth International Conference on Digital Processing of Signals in Communications, Loughborough, pp 11–15, September 1988.
3. Oliver J—'Stable Methods of Evaluating Cos $(i\pi/n)$', J Inst Maths Applic, Vol 16, pp 247–258, 1975.

APPENDIX

This is a ZBASIC listing of a simulation program for implementing the invention using the algorithm described above to enhance accuracy.

```
00010   REM ON-LINE CREATION OF SINUSOIDS
00020   REM L. F. Lind, 6th March, 1989.
00030   REM Initialisation.
00040   REM Ba = the number of accurate bits.
00050   REM S = sine array, created on-line.
00060   REM Sc = calculated sine array (12 digit
        accuracy).
00070   REM C = cosine array, created on-line.
00080   REM Cc = calculated cosine array (12 digit
        accuracy).
00090   REM SEC = secant array of constants.
00100   REM CSC = cosecant array of constants.
00110   REM SW = switch array, to choose SEC or CSC element.
00120   REM D = constants in LOG2 subroutine.
00130   REM N% = number of sample points to be computed.
00140   REM NLG% = log (base 2) of N%, rounded up . . .
00150   REM to the nearest integer.
00160   REM T = radian angle increment.
00170   BREAK ON
00180   CLS
00190   DIM S(12),Sc(2000),C(12),Cc(2000),SEC(12),CSC(12),SW%(12)
00200   DIM D(3),E(2000),F(2000)
00210   Ba=65536:REM This gives 16 bit accuracy.
00250   T=1
00260   N%=10: NLG%=4
00270   dXp=1000/(N%−1)
00320   REM Initialisation of S,C,SEC,CSC, and SW% arrays.
00330   FOR K%=0 TO NLG%
00340   X=SIN(2 K%*T):GOSUB"round":S(K%)=X
00350   X=1/(2*S(K%)):GOSUB"round":CSC(K%)=X
00360   X=COS(2 K%*T):GOSUB"round":C(K%)=X
00370   X=1/(2*C(K%)):GOSUB"round":SEC(K%)=X
00380   SW%(K%)=1
00390   IF ABS(SEC(K%))>ABS(CSC(K%))THEN SW%(K%)=0
00400   NEXT K%
00410   REM Initialisation of the D array.
00420   D(0)=43690:D(1)=52428
00430   D(2)=61680:D(3)=65280
00460   REM N1% is argument of number next to the chosen one.
00470   REM B% is argument of number below the chosen one.
00480   REM On-line creation of sine values.
00520   REM ******** Start of main loop ********
00530   FOR K%=1 TO N%
00540   J%=K% AND −K%:J2%=2*J%
00550   NS%=J%:GOSUB"LOG2":L%=JS%:L1%=L%+1
00560   F%=K%+3*J%−(J2% AND K%)
00570   NS%=F% AND −F%:GOSUB"LOG2":L2%=JS%
00590   E(K%)=E1
00600   REM Find the next table value.
00610   IF SW%(L%)=0 GOTO 670
00620   X=SEC(L%)*(S(L1%)+S(L2%)):GOSUB"round":S(L%)=X
00630   X=SEC(L%)*(C(L1%)+C(L2%)):GOSUB"round":C(L%)=X
00640   GOTO 710
00650   REM Here we use cosecant, rather than secant.
00660   REM First, we arrange argu(L1%)<argu(L2%).
00670   IF F%>K%+J2% GOTO 690
00680   R%=L1%:L1%=L2%:L2%=R%
```

-continued

```
00690    X=CSC(L%)*(S(L2%)−S(L1%)):GOSUB"round":C(L%)=X
00700    X=CSC(L%)*(C(L1%)−C(L2%)):GOSUB"round":S(L%)=X
00710    REM Output sin and cos
00720    PRINT "sin of "K%" = "S(L%)
00730    PRINT "cos of "K%" = "C(L%)
00840    NEXT K%
00850    REM ************ End of main loop *************
01050    "LOG2"
01060    JS%=0
01070    FOR KS%=3 TO 0 STEP −1
01080    JS%=2*JS%
01090    IF(NS% AND D(KS%))=0 GOTO 1110
01100    JS%=JS%+1
01110    NEXT KS%
01120    RETURN
01130    "round"
01140    S=SGN(X):Y=INT(X*Ba+0.5*S)
01150    X=Y/Ba
01160    RETURN
```

I claim:

1. A digital signal processing device comprising an input for receiving an input electrical signal, an output for making an output electrical signal available, and electrical processing circuits for processing the input signal to produce said output signal, the processing circuits including an electrical trigonometric function generator for generating a value of a trigonometric function in response to an input argument provided by said electrical processing circuits, said trigonometric function generator comprising: electrical input elements for receiving an input argument; first electrical storage elements for storing digital values of the function corresponding to spaced argument values; and arithmetic circuitry associated with said first electrical storage elements for interpolatively calculating, using a first algorithm, values of the function corresponding to arguments lying in the spaces between said spaced argument values;

second electrical storage elements for storing digital values of a second, complementary function corresponding to spaced argument values;

said arithmetic circuitry also being associated with said second electrical storage elements for interpolatively calculating, using a second algorithm, values of said function corresponding to arguments lying in the spaces between said spaced argument values from values of the second complementary function corresponding to the neighbouring predetermined argument values; and electrical logic control elements for selectively employing the second storage elements and algorithm for an input argument if use with said first store and said first algorithm gives rise to a substantial round-off error.

2. A digital signal processing device according to claim 1, wherein the function is a sine function and the complementary function is a cosine function, or vice versa, or a function derived therefrom.

3. A digital signal processing device according to claim 1 or claim 2, further comprising electrical elements for supplying an incremental (or decremental) sequence of arguments to said electrical input elements, whereby the function generator output comprises a time sequence corresponding to the function.

4. A digital signal processing device according to claim 3, wherein the first electrical storage elements are dimensioned to store fewer than the total number of function values which will be generated, and the arithmetic circuitry is arranged to calculate a further function value, and to replace an output function value in the first electrical storage elements with the further function value.

5. A digital signal processing device according to claims 1 or 2, in which the arithmetic circuitry is arranged to also generate, for the or each input value, the value of the complementary function.

6. A digital signal processing device according to claims 1 or 2, further comprising analogue output circuits for producing an analogue output corresponding to the generated digital function value.

7. A digital signal processing device according to claims 1 or 2, further comprising analogue output circuits for producing an analogue output corresponding to the generated digital function value, and wherein said digital signal processing device is used to generate tones.

8. A device according to claim 2, in which the electrical processing circuits are arranged to perform a spectral transform operation.

9. A device according to claim 8, wherein the transform operation is a Fourier transform.

* * * * *